A. L. HARNED.
Ditching-Plow.
No. 161,509.  Patented March 30, 1875.
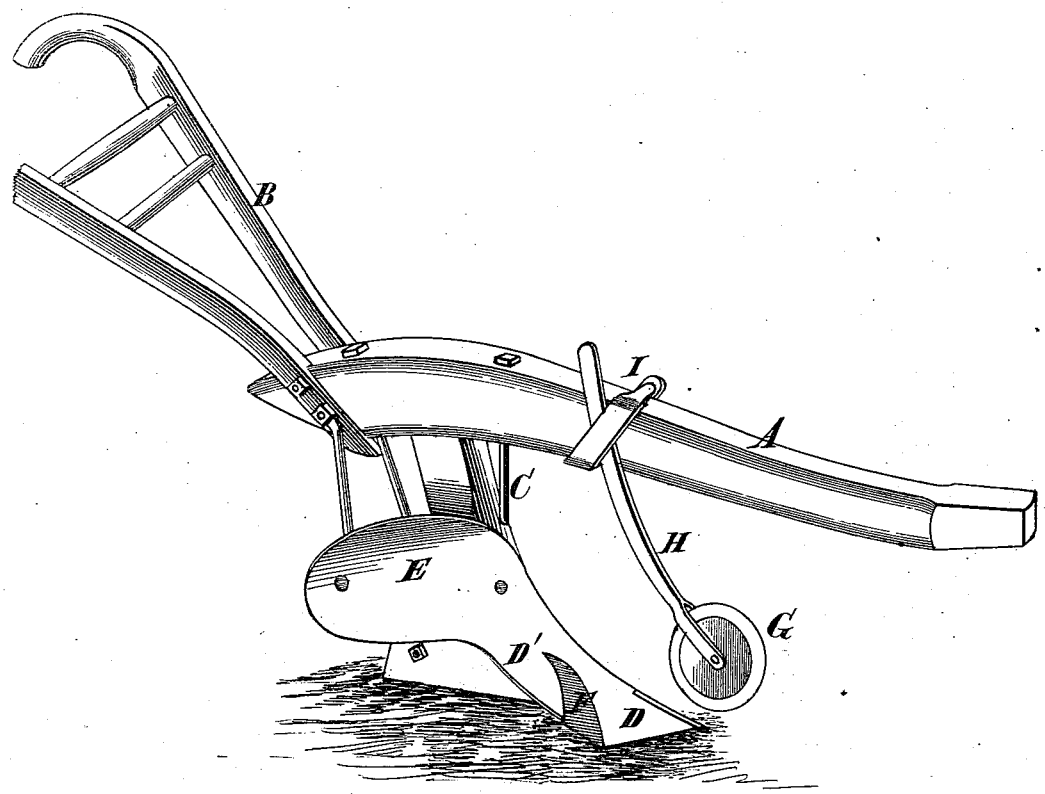

UNITED STATES PATENT OFFICE.

ATKINSON L. HARNED, OF BOSTON, KENTUCKY.

IMPROVEMENT IN DITCHING-PLOWS.

Specification forming part of Letters Patent No. 161,509, dated March 30, 1875; application filed March 8, 1875.

*To all whom it may concern:*

Be it known that I, ATKINSON L. HARNED, of Boston, in the county of Nelson and State of Kentucky, have invented an Improvement in Plows, of which the following is a specification:

This invention consists in providing a ditching-plow the share of which, having the ordinary upward inclination from the cutting-edge, has an elongated neck to carry the slice of earth above the surface of the ground before it reaches the mold-board proper, which is attached to the upper end of the neck of the share, or forms a part thereof, and is so shaped as to turn the slice over onto the side of the ditch; one side of the share being provided with a vertical stationary cutter to cut down one side of the ditch, while the other side of the share is overhung by a vertical adjustable revolving cutter, suspended from the beam, to cut down the other side of the ditch.

The drawing illustrates my improved ditching-plow in perspective, A referring to the beam, provided with the handles B and a standard, C, suitably braced, as shown. In the example illustrated, the share D, with its elongated neck D', and the mold-board E, constitute a single piece of metal; they may, however, be made of separate pieces suitably connected together. The length of the share and its neck depends upon the depth of the ditch to be cut and the inclination given to it; it being such in every case that the line of junction between the neck and mold-board will be above the surface of the ground, so that the slice of earth will not be deflected until it is above ground. Once there, the mold-board E will force it over and deposit it on the side of the ditch. The share is provided with a fixed cutter, F, on one side; upon the other side a revolving cutter, G, operates. The cutter is hung in the fork of a bar, H, which is secured to the beam A by a clip, I, so that it may be adjusted with reference to the cutting-edge of the share.

I am aware that ditching-plows are known in which the slice of earth is carried up a continued channel from the cutting-edge of the share to the tail end of the mold-board, to be discharged at the side of the ditch. Ditching-plows thus made have to overcome an exceedingly great amount of friction, are exceedingly difficult to operate in consequence thereof, and are also very liable to become cracked. These objections are wholly overcome by my improvement, besides which my ditching-plow is cheap, and more easily made and repaired.

What I claim as my invention, and desire to secure by Letters Patent, is—

The share D, having an elongated neck, D', and mold-board E, in combination with a fixed cutter, F, and revolving adjustable cutter G, all constructed and arranged substantially as and for the purpose specified.

In testimony whereof I have signed my name to this specification in the presence of two subscribing witnesses.

A. L. HARNED.

Witnesses:
ROBERT MURPHY,
JNO. C. WICKLIFFE, Jr.